(12) United States Patent
Alse

(10) Patent No.: US 7,778,720 B2
(45) Date of Patent: Aug. 17, 2010

(54) METHOD AND SYSTEM FOR PRODUCT LINE MANAGEMENT (PLM)

(75) Inventor: Deepak Alse, Bangalore (IN)

(73) Assignee: Wipro Limited, Bangalore, Karnataka (IN)

(*) Notice: Subject to any disclaimer, the term of this patent is extended or adjusted under 35 U.S.C. 154(b) by 535 days.

(21) Appl. No.: 11/697,336

(22) Filed: Apr. 6, 2007

(65) Prior Publication Data

US 2008/0249646 A1    Oct. 9, 2008

(51) Int. Cl.
G06F 19/00 (2006.01)
G05B 13/02 (2006.01)

(52) U.S. Cl. .................. 700/103; 700/28; 700/96; 700/105; 705/8

(58) Field of Classification Search .............. 700/16, 700/28–31, 48, 95–97, 99–111, 116, 121, 700/216; 705/4, 7, 8, 28, 29
See application file for complete search history.

(56) References Cited

U.S. PATENT DOCUMENTS 6,975,914 B2 * 12/2005 DeRemer et al. ............. 700/96

7,522,968 B2 * 4/2009 Hongkham et al. ......... 700/100

* cited by examiner

Primary Examiner—Sean P Shechtman
(74) Attorney, Agent, or Firm—Prakash Nama; Global IP Services, PLLC

(57) ABSTRACT

A method and system for a product line management is presented. The system is capable of performing steps of the method. The method includes a first step of obtaining a product line architecture (PLA). A second step of obtaining a Change Management Workflow (CMW), the CMW includes a plurality of change activities, and the CMW being capable of interacting with the PLA. A third step of obtaining value stream maps for both the PLA and the CMW. A fourth step of creating activity lines for each of the change activity according to the PLA and the CMW. A fifth step of computing risk indicatives for the PLA and the CMW. A sixth step of triggering changes in the PLA and the CMW according the change activity, activity line, risk indicatives, or any combination thereof. And another step of repeating the steps of obtaining value stream maps onwards while managing the product line.

30 Claims, 13 Drawing Sheets

METHOD AND SYSTEM FOR PRODUCT LINE MANAGEMENT (PLM)

FIELD OF INVENTION

The invention relates to a method and system for Product Line Management (PLM).

BACKGROUND

During a PLM process of a product line, various decisions are required to be made. These decisions may be made according to many aspects, such as, regulatory requirements, technologies and business processes of the product line. Any decision made in view any one of the aspects may result in a requirement of making another decision relating to another aspect. Consequently, a decision making process may impose a number of changes in the PLM process across the aspects. Shrinking Time To Market (TTM), increasing competition and fast changing technology has added more venerability to the PLM process by entailing often changes in the process. In such situations, it is desirable to have a system and a process for PLM that may quickly adapt to the changes made across different aspects of the PLM process and provide a robust solution.

Existing PLM processes and systems generally provide a framework that may provide a solution for an aspect of the PLM process. However, determining the effect of the solution provided by the framework on other aspects, and obtaining a complete PLM process has remained a job of a skilled person. In spite of or because of, involvement of the skilled person chances of achieving a foolproof PLM process/system are considerably low. For example, in an implementation the PLM maps may be drawn by technical architects, thus mapping of the product components may become dependent on individual expertise which may result in failures when such expertise are not available. Further because of increasing complexities of decision making process of different aspects and their integration issues with one another, accomplishment of the PLM process/system has become more time consuming and expensive affair.

Further, with the existing PLM processes, where inherent traceability of different aspects may not be made available, implementation of changes in the PLM may become complicated. Also existing PLM processes do not provide an end to end solution from conceptualization of a product till the end of life of the product. Therefore transferring knowledge from one adaptation of the product to another becomes difficult.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION OF FIGURES

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
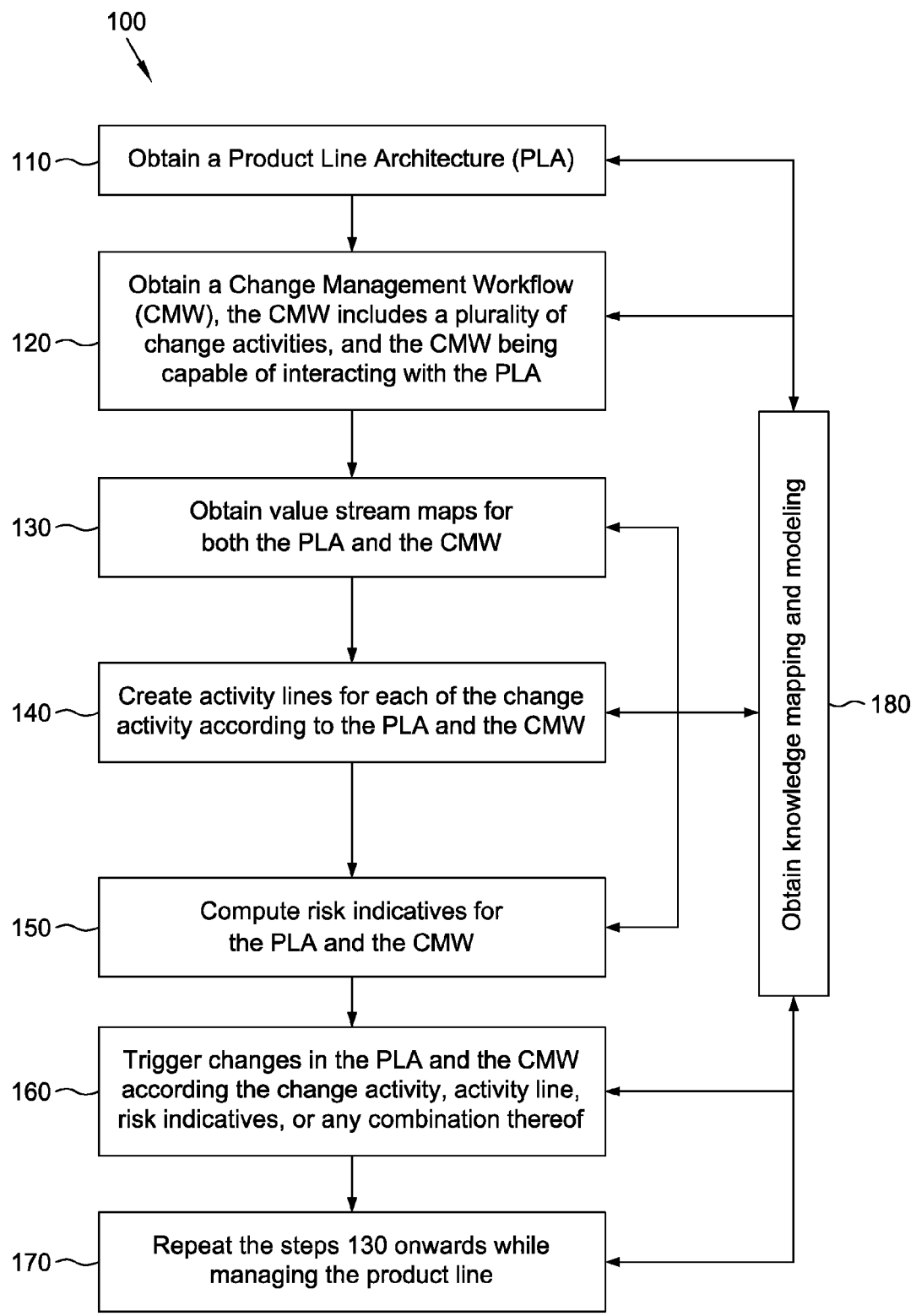
FIG. 1 shows a method in accordance with an embodiment of the present subject matter.
Figure 2:
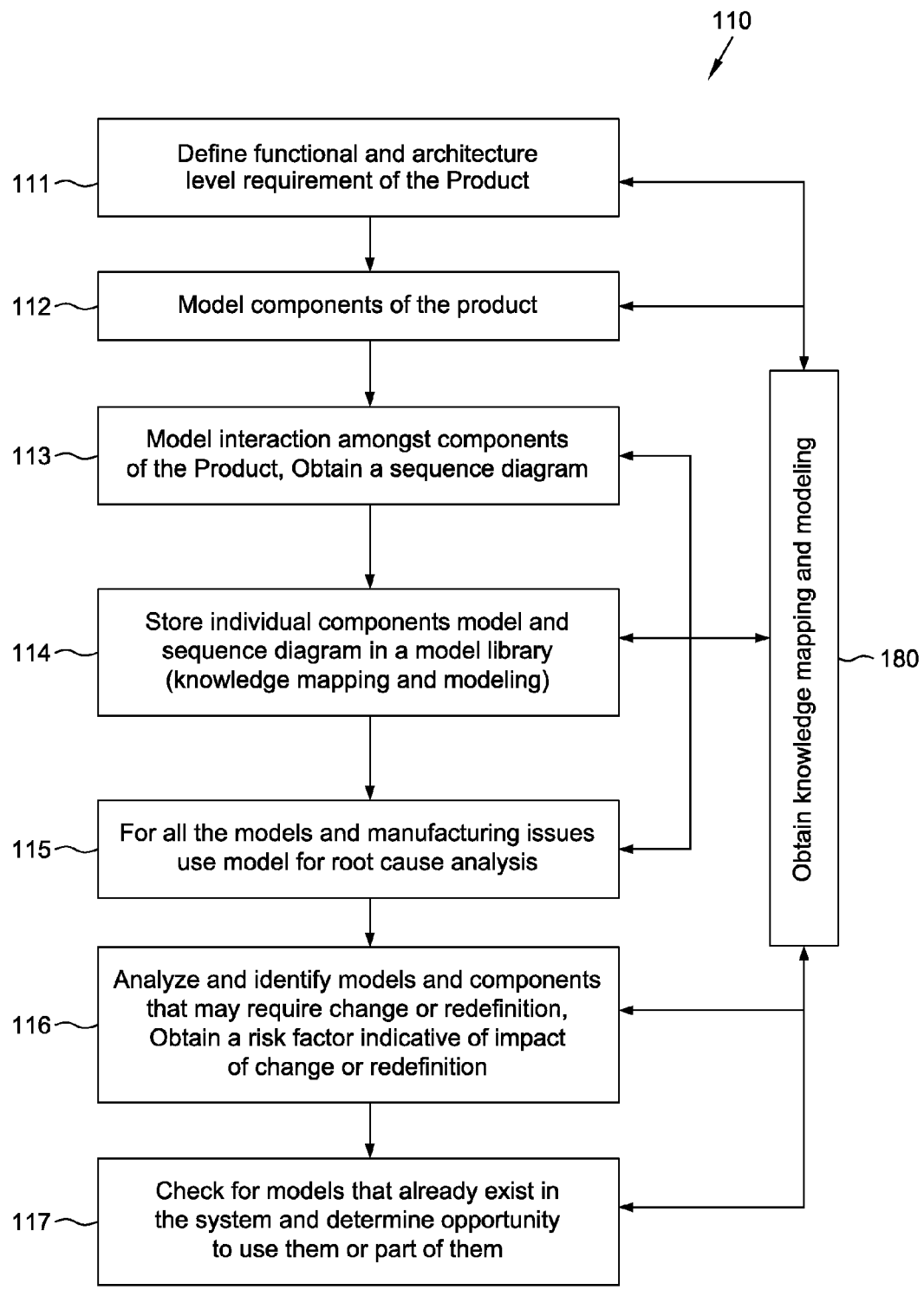
FIG. 2, FIG. 6 to FIG. 12 shows the method of FIG. 1 in more detail in accordance with present invention.

FIG. 1 show steps 100 followed for implementing a method for PLM. The method 100 may include a number of steps, each step may obtain one or more PLM processes (hereinafter processes/process). A product line may involve one or more products/processes. Each of the products/processes may have one or more components (hereinafter components). At step 110 of the method 100 a Project Line Architecture (PLA) is obtained. At this step architectural elements and interfaces of products/components of the products involved in the product line and/or process (process models) are acquired. This may be achieved using Unified Modeling Language (UML) tools (e.g., interaction diagrams, swim lanes, state diagrams etc). Each of the products/processes may be modeled into the components. A product/process may be modeled into components according to a top down model at either architectural level or behavioral level or functional level or any combination thereof. The top down model may be based on use cases. The use case may be a UML tool for defining users and usage methods for identified functionality/ies. Each of the use case captures an interaction between the user and the product as well as associated processes. The collected use cases specify possible existing ways of using a system that includes one or more products of the product line as well as the system itself. At this step common models may also be identified. The common models may be the models that may be common across products/processes in the product line, within a product/process across the components, or across a product and a process or any other combination. A model may be identified as common model if the component/product/process models that may exist elsewhere. The common models may be identified using a knowledge maps and library models and/or scope the opportunity to use them. The knowledge maps and library models may be dynamically updated to include any new components model obtained (step 180). The common models may be augmented with component models. This augmentation may help to simplify or expand a product. Implementation of the step 110 by defining the PLA, products/processes/components models in one design, the mapping of the product/process/component over PLA may be made independent of individual expertise, as a single design can be used for other products in the PLA or across multiple PLAs. An example depicting this step in more details is shown in FIG. 2 and described later. At step 120, a change management workflow (CMW) may be obtained. The CMW includes a number of change activities/processes. The CMW may be designed to allow cross functional interaction between product design, product engineering, product operations and product marketing teams. The step 120 may be performed using UML tools or any other business process modeling tool. The business process modeling tool may be a software or a hardware or a firmware to or any other tool that may be a tool made of any combination thereof. At step 120, interaction diagram (details) amongst products/processes/components may be obtained. At step 120, swimlane diagram, state diagram may be used for mapping product change with process change. A traceability matrix for change activity may be obtained according to the PLA. This offers traceability at both product component level and manufacturing process level, because the process models, product models and the CMW together or individually allow to trace impact of a change at any level in the PLM. At step 130, Value Stream Maps (VSM) may be obtained for the PLA and the CMW. The VSM are indicatives of various stage of value addition in a process. The VSM may be obtained using LEAN principles. The LEAN principles relate to elimination of wastage by tracing the creation of value in backward order starting from demand and optimizing at every step of creation of the value. The step of obtaining the VSM may include employing of use case diagrams. The step 130 allows obtaining the value of a process from the customer point of view. The use case defines what a customer values in terms of features. The use case diagram is the root of what may be defined as value obtained by the user from the product/process. This step lends itself to obtain a value flow for the product and/or related implementation processes. The value flow indicates to a feature or a critical requirement for the feature that is valued by the used as per the use case diagram. One or more points of reference may be obtained according to the value stream map and PLA and/or CMW. The point of reference indicates, if a product or a process adds value according to a customers expectations, and if yes, then how much. This step may yield information regarding product portfolio rationalization, value engineering plans, application of design for manufacturability and design for testability procedures and/or standardization of product change processes, by identifying and monitoring point/s of reference, it may be identified if value addition is proportional or effective. The points of reference may also be used for monitoring identify recurring problem areas and standardizing process across multiple products/processes having similar value addition points. At step 130 value flow for both the PLA and the CMW may also be identified. The VSM identify value addition at each stage of a product related processes. The value addition may be observed as a flows from raw material till the final product as well as through the service process. The VSM for both the PLA and CMW also identify the points where the PLA features may interact with the CMW. If a process or a product feature that is expected by the customer as per use case is not fulfilled by the value stream map or if a redundant process/feature exists, then that process/feature needs to be investigated. At step 140, Activity Line/s (AL) for each of the change activity may be created according to the PLA and the CMW. An AL puts together a sequence of activities that affect similar event across products/process in a product line. A change activity is any activity that may add value to a product/process or enhance the product/process experience through services or through a change in form or function of the product/process. At step 140, the AL is/are created across the multiple product lines. This means that a common CMW for multiple products in the PLA may also be created. The AL are repeatable measurable processes that may be common to one or more products/processes in the PLA and those that can be put into a structure of the CMW. The VSM, PLA and CMW may be used for creating AL. Multiple products/processes in a product line may share an AL for similar activity and/or Subject-Oriented Program (SOPs). According to the AL operational time requirements may be assessed and standardized. Also by creating AL, any deviation in the process can be measured and tracked. While creating an AL framework, the steps of eliminating waste or redundant steps, standardizing process or any cycle time and automatizing LEAN principle may be followed. Using LEAN processes may enable identifying value addition based on customer requirements. LEAN processes may reduce the cycle time and cumulative effort while improving the quality of output and productivity of the product/process. At step 150, the Risk Indicatives (RI) for the PLA and the CMW may be computed. At this step the use case models and Failure Mode and Effect Analysis (FMEA) may be used defining failure modes for the products/processes and product/process change processes. This step achieves integration of FMEA for both product and processes. For critical issues DMADV process may be set in place for improvements. The DMADV is an acronym for the five phases of a Six Sigma project: Define Measure, Analyze, Design and Verify. For non-critical cases DMAIC process may be used. The DMAIC is an acronym for Define, Measure, Analyze, Improve, Control. A less common application of the Six Sigma methodology employed when a new process needs to be created or, an existing process is so badly broken that it needs to be re-investigated. The DMADV process may also be used for product/process enhancements and value engineering. At step 160, the changes in the PLA and the CMW may be triggered based on the change activity, AL and/or RI. At this step FMECA (Failure Modes Effects and Criticality Analysis) charts for processes and products may be created. According to these charts different risk level with respect to commercial, revenue, process, technology and people etc may be defined. According to the risk levels FMECA charts may be updated and risk grades may be assigned against each risk factor. The risks may fall under any of the categories, for example, commercial, revenue, process, technology and/or people. This is an analytical assessment process/product that may embed change triggers into the AL and/or product and process architecture. The change triggers may be either of software, hardware, firmware and/or visual. This makes the method fairly, independent of individual expertise because of following reason. The interaction points between the PLA and CMW are flagged. These are indicative of the change triggers, for change triggers a baseline (reasons for triggering a change) and limits of the process/product may be defined/identified. Because the AL have been clearly defined and deviation, in both intentional and those which are caused due to external/internal factors, becomes clearly visible at the interaction point. This can indicate deviation in any direction for example, inwards or outwards or critical CMW-PLA interaction areas. Since various components of the PLA as well as the CMW have already been modeled and specified, any deviation indicates change trigger. If a change needs to be made to the product or the process that change can be understood from the key interaction point that gets affected due deviation. This step may indicate the need to change the process and/or revisit the value stream, or automatically initiate change in the PLA or CMW or at any other step. Risk computation for both of product and processes increases the robustness of the method. At step 170, the steps 130 onwards may be repeated to include changes in the VSM and AL in view of the changes triggered by at step 160. The step 180 is a step of creating a knowledge repository, a product model library and/or product data library. This process may run while any one or more of above steps are being executed. This step allows gathering of information. This step enables to identify external environment changes related to the technology used by the product, a change in customer requirements. Once the change in customer requirement is identified the changes may be identified and structured according to existing product model and/or process used by the PLA. At this step knowledge mapping, modeling and/or sharing of the product line information and/or change management process may be obtained. The knowledge mapping and modeling occurs iteratively along the other steps and may ensure that the data obtained may enhance the architecture and/or designs of the components of the product/process by creating knowledge repositories, product model libraries, process model libraries and/or product/process data libraries.

FIG. 2 shows steps 110 in more details. According to one example at step 111 functional and architecture level requirement of the product may be defined. The definitions may include, answers to the questions such as, what does the product do; where in the system architecture does the product fit; which elements of the system architecture does the product interact with etc. Use-Case diagrams may be used at this step. The use case diagrams may depict details like the function of the product, the elements of the architecture that the product interacts with, the elements of the architecture the product interacts with, etc. At step 112 the components of the product/s/process/es may be modeled using UML component diagrams. The UML component diagram may show the structural relationships between the components of the product/process. It may allow the user to verify requirement of a functionality that is being implemented by the components, and/or to check their acceptability in view of the functionality. At the following step 113, the interaction amongst components of the product/process may be modeled using a sequence diagram. The step may include modeling of hardware and/or software connections within the components during a certain period of time. At step 114, the product design is implemented and individual product models/process models/components (model) and/or sequence diagrams may be stored in a model library. A sequence diagram is a diagram depicting the interaction between various product/process in time sequence. At step 115, fields and/or manufacturing issues may be modeled that may be used in root cause analysis. The root cause analysis may be a process for identifying the basic or causal factor(s) that underlies variation in performance, including the occurrence or possible occurrence of a sentinel event. The root cause analysis may be performed for identifying basic or causal factor underling variation in performance including the occurrence or possibility of occurrence of a sentinel event. The instant method provides baseline as well as process and component visibility and hence improves the root cause analysis process. At the following step 116, the structures of the different elements of components/products/processes models that require change or redefinition may be analyzed and identified. The components/products/processes models also decide the impact of change and/or may discover probable risk factors associated with the product. Thus, a risk factor indicative of impact of change or redefinition may be obtained. In a step 117, the component/product/process models that may exist elsewhere may be checked using the model library and/or the scope of opportunity to use them. The step 180 is same as discussed earlier.

Figure 3:
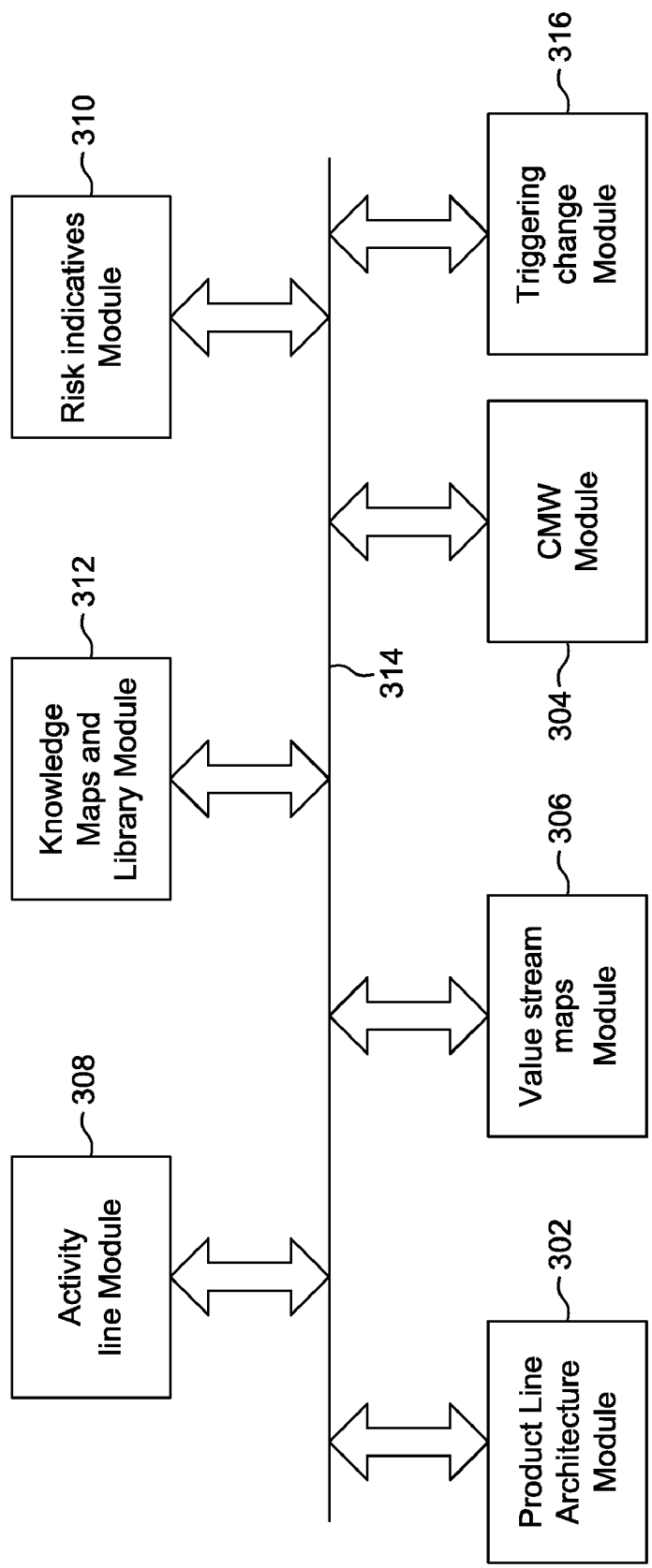
FIG. 3 shows a system in accordance with an embodiment of the present subject matter.

FIG. 3 is a system 300 of a PLM according to present subject matter. The system includes a product line architecture (PLA) module 302, a Change Management Workflow (CMW) module 304, a value stream map module 306, an activity lane module 308, a RI module 310, a triggering module 316 and a knowledge map and library module 312.

These modules may interact with one another via line 314. The line 314 may be any form of information backbone and may relate to software or non-software systems. A product line may involve one or more products/processes. Each of the products/processes may have one or more components (hereinafter components). The PLA module 302 may be configured to obtain a Project Line Architecture. The PLA module 302 may be configured for acquiring architectural elements and interfaces of products/components of products involved in the product line and/or process (process models). The PLA module 302 may achieve this using Unified Modeling Language (UML) tools (e.g., interaction diagrams, swim lanes, state diagrams etc). Each of the products/processes may be modeled into components by the PLA module 302. The PLA module 302 may product/process models into components according to a top down model at either architectural level or behavioral level or functional level or any combination thereof. The top down model may be based on use cases. The use case may be a UML tool for defining the users and the usage methods for certain functionality. Each use case may capture an interaction between the user and the product as well as associated process. The collected use cases specify existing ways of using a system that includes the product as well as the system itself. At the PLA module 302 common models may also be identified. The common models may be the models that may be common across products/processes in the product line, within products/processes across the components or across product and a process or any other combination. A model may be identified as common model if the component/product/process models that may exist elsewhere. The common models may be identified using a knowledge maps and library models and/or scope the opportunity to use them. The knowledge maps and library models may be dynamically updated to include any new components model obtained. The common models may be augmented with component models. This augmentation may help to simplify or expand a product. At the PLA module 302 by defining the PLA, products/processes/components models in one design the mapping of the product/process/component over PLA may be made independent of individual expertise, as a single design can be used for other products in the PLA or across multiple PLAs. According to one example the PLA module 302 may be configured to include definitions of functional and architecture level requirements of the product. The definitions may include, answers to the questions such as, what does the product do; where in the system architecture does the product fit; which elements of the system architecture does the product interact with etc. Use-Case diagrams may be used at this step. The use case diagrams may include details such as the function of the product, the elements of the system architecture that the product interacts with, the elements of the system architecture the product interacts with, etc. The PLA module may also be configured for modeling the components of the product/s/process/es using UML component diagrams. The UML component diagrams may include the structural relationships between the components of the product/process. It may allow the user to verify requirement of a functionality that is being implemented by the components, and/or to check their acceptability in view of the functionality. The PLA module 302 may be configured for modeling the interaction amongst components of the product using a sequence diagram. The PLA module 302 may include a modeling unit for modeling of hardware and/or software connections within the product components during a certain period of time. The PLA module may implement the product design and individual product model/process models/component models and/or sequence diagrams may be stored in the knowledge mapping library 312. A sequence diagram is a diagram depicting the interaction between various product/process in time sequence. The PLA module 302 may also be configured for modeling fields and/or manufacturing issues that may be used in root cause analysis. The root cause analysis may be a process for identifying the basic or causal factor(s) that underlies variation in performance, including the occurrence or possible occurrence of a sentinel event. The root cause analysis may be performed for identifying basic or causal factor underling variation in performance including the occurrence or possibility of occurrence of a sentinel event. The instant method provides baseline as well as process and component visibility and hence improves the root cause analysis process. The PLA module 302 may be configured for analyzing and identifying the structures of the different elements of models and/or components that require change or redefinition. The components/products/processes models also decide the impact of change and/or may discover probable risk factors associated with the product. Thus, a risk factor indicative of impact of change or redefinition may be obtained. The PLA module 302 may further be configured for checking the component/product/process models that may exist elsewhere the knowledge mapping library 312 and/or the scope of opportunity to use them. The CMW module 304 may be configured to include a number of change activities/processes. The CMW module 304 may be designed to allow cross functional interaction between the product design, product engineering, product operations and product marketing teams. The CMW module 304 may be configured for obtaining a change management workflow (CMW) using UML tools or any other business process modeling tool. The business process modeling tool may be a software or a hardware or a firmware tool or any other tool that may be a tool made of any combination thereof. The CMW module 304 may be configured for obtaining interaction diagram (details) amongst processes/products/components. The CMW module 304 may obtain the change management work flow using, swimlane diagram, state diagram, which may be used for mapping product change with process change. A traceability matrix for change activity may be obtained according to the PLA module 302. Obtaining traceability matrix allows traceability at both product component level and manufacturing process level, because the process models, product models and the CMW together or individually allow to trace impact of a change at any level in the PLM. The VSM module 306 may be configured for obtaining VSM the PLA and the CMW. The VSM obtained using VSM module 306 are indicatives of various stage of value addition in a process. The VSM module 306 may be configured for obtaining these maps by employing LEAN principles and use case diagrams. The LEAN principles relate to elimination of wastage by tracing the creation of value in backward order starting from demand and optimizing at every step of creation of the value. The VSM module 306 allows obtaining the value of a process from the customer point of view. The use case defines what a customer values in terms of features. The use case diagram is the root of what may be defined as value obtained by the user from the product/process. The VSM Module 306 lends itself to obtain a value flow for the product and/or related implementation processes. The value flow indicates to a feature or a critical requirement for the feature that is valued by the used as per the use case diagram. One or more points of reference may be obtained according to the value stream map and PLA and/or CMW. The point of reference indicates, if a product and/or a process adds value according to a customers expectations, and if yes, then how much. The VSM module 306 may yield information regarding product portfolio rationalization, value engineering plans, application of design for manufacturability and design for testability procedures and/or standardization of product change processes, by identifying and monitoring point/s of reference, it may be identified if value addition is proportional or effective. The points of reference may also be used for monitoring identify recurring problem areas and standardizing process across multiple products/processes having similar value addition points. The VSM module 306 may be configured for identifying the value flow for both the PLA and the CMW. The VSM identify value addition at each stage of a product related processes. The value addition may be observed as a process flows from raw material till the final product as well as through the service process. Creation of the VSM for both the PLA and CMW identifies the points where the PLA features interact with the CMW. If a process or a product feature that is expected by the customer as per use case is not fulfilled by the value stream map or if a redundant process/feature exists, then that process/feature needs to be investigated. The AL module 308 may be configured for creating AL for one or more change activities according to the PLA and the CMW. An AL puts together a sequence of activities that affect similar event across products/process in a product line. A change activity is any activity that may add value to a product/process or enhance the product/process experience through services or through a change in form or function of the product/process. The AL module 308 may create the AL across the multiple product lines. This means that a common CMW for multiple products in the PLA may also be created. The AL created by the AL module 308 are repeatable measurable processes that may be common to one or more products/process in the PLA and those that can be put into a structure of the CMW. The AL module 308 may use VSM, PLA and CMW for creating AL. Multiple products in a product line may share an AL for similar activity and/or Subject-Oriented Program (SOPs). According to the AL operational time requirements may be assessed and standardized. Also by creating AL, any deviation in the process can be measured and tracked. While creating AL a framework, the steps of eliminating waste or redundant steps, standardizing process or any cycle time and automatizing LEAN principle may be followed. Using LEAN processes may enable identifying value addition based on customer requirements. LEAN processes may reduce the cycle time and cumulative effort while improving the quality of output and productivity of the product/process. The RI module 310 may be configured for computing RI for the PLW and the CMW. The RI module 310 may employ the use case models and Failure Mode and Effect Analysis (FMEA) for defining failure modes for the products/processes and product/process change processes. The RI module 310 achieves integration of FMEA for both product and processes. For critical issues DMADV process may be set in place for improvements. For non-critical cases DMAIC process may be used. A less common application of the Six Sigma methodology may be employed when a new process needs to be created or, an existing process is so badly broken that it needs to be re-investigated. The DMADV process may also be used for product/process enhancements and value engineering. Changes in the PLA and the CMW may be triggered based on the change activity, AL and/or RI. At this module FMECA (Failure Modes Effects and Criticality Analysis) charts for processes and products may be created. According to these charts different risk level with respect to commercial, revenue, process, technology and people etc may be defined. According to the risk levels FMECA charts may be updated and risk grades may be assigned against each risk factor. The risks may fall under any of the categories, for example, commercial, revenue, process, technology and/or people. This is an analytical assessment process/product that may embed change triggers into the AL and/or product and process architecture. The change triggers may be either of software, hardware, firmware and/or visual. This makes the system fairly independent of individual expertise because of following reason. The interaction points between the PLA and CMW are flagged. These are indicative of the change triggers, for change triggers a baseline (reasons for triggering a change) and limits of the process/product may be defined/identified. Because the AL have been clearly defined and deviation, in both intentional and those which are caused due to external/internal factors, becomes clearly visible at the interaction point. This can indicate deviation in any direction for example, inwards or outwards or critical CMW-PLA interaction areas. Since various components of the PLA as well as the CMW have already been modeled and specified, any deviation indicates change trigger. If a change needs to be made to the product or the process that change can be understood from the key interaction point that gets affected due deviation. The RI module 310 may indicate the need to change the process and/or revisit the value stream, or automatically initiate change in the PLA or CMW or at any other step. Risk computation for both of product and processes increases the robustness of the system 300. The system 300 may be configured for repeating various steps performed by different modules of the system 300 to include changes in the VSM and AL in view of the changes triggered at any step or by RI 310. The system further provides a knowledge mapping library (KML) module 314 for creating a knowledge repository, a product model library and/or product data library. The KLM module 314 may collect information while any one or more of above modules are operating. Providing KLM module 314 allows gathering of information. This step enables to identify external environment changes related to the technology used by the product, a change in customer requirements. Once the change in customer requirement is identified the changes may be identified and structured according to existing product model and/or process used by the PLA. The KLM module 314 may be configured for obtaining knowledge mapping, modeling and/or sharing of the product line information and/or change management processes. The KLM module 314 may operated iteratively along the other modules and may ensure that the data obtained may enhance the architecture and/or designs of the components of the product/process by creating knowledge repositories, product model libraries, process model libraries and/or product/process data libraries.

Figure 4:
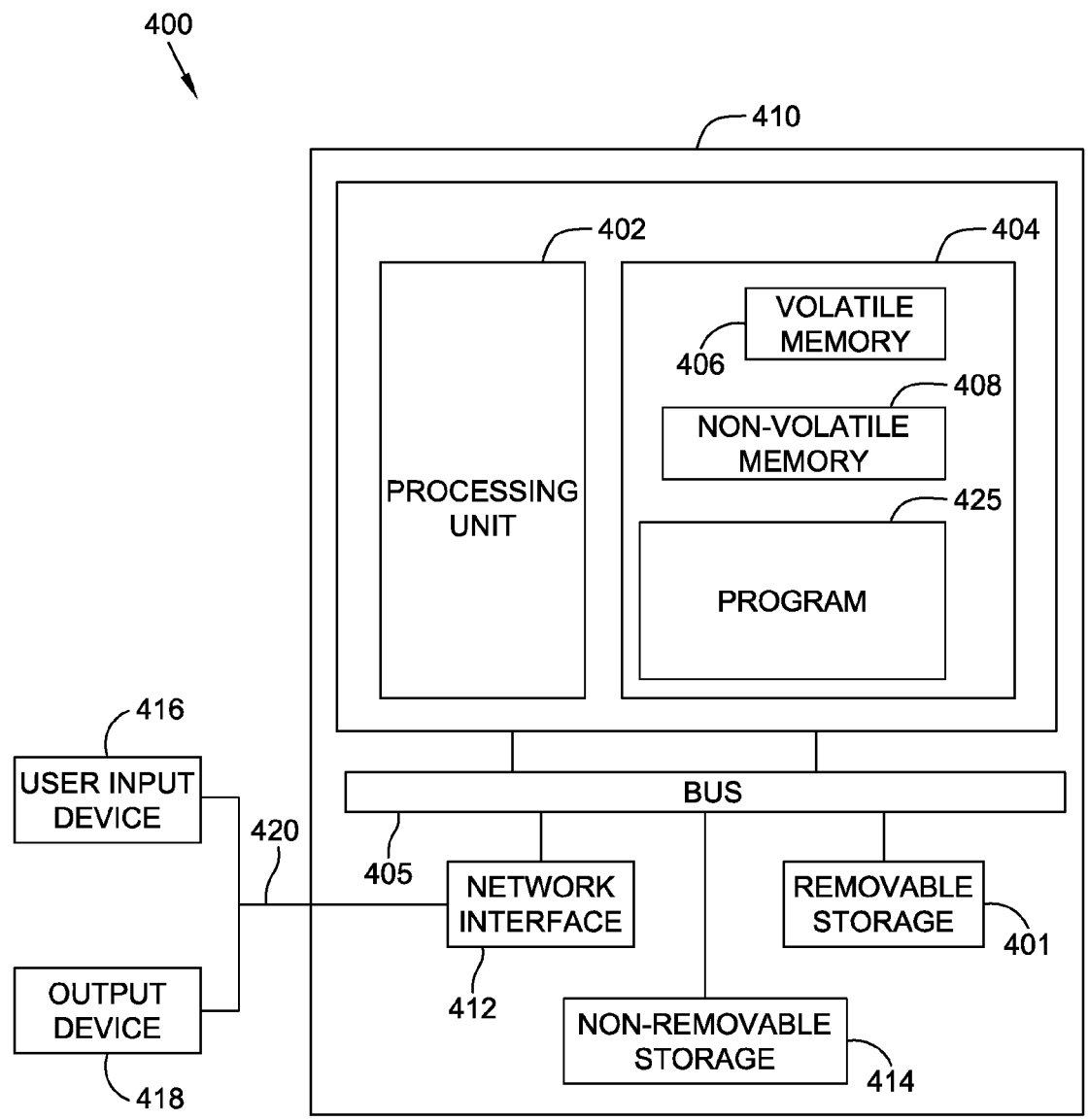
FIG. 4 shows a suitable computing system environment for implementing embodiments of the present subject matter.

FIG. 4 shows an example of a suitable computing system environment 400 for implementing embodiments of the present subject matter. FIG. 4 and the following discussion are intended to provide a brief, general description of a suitable computing environment in which certain embodiments of the inventive concepts contained herein may be implemented.

A general computing device, in the form of a computer 410, may include a processor 402, memory 404, removable storage 401, and non-removable storage 414. Computer 410 additionally includes a bus 405 and a network interface 412.

Computer 410 may include or have access to a computing environment that includes one or more user input devices 416, one or more output devices 418, and one or more communication connections 420 such as a network interface card or a USB connection. The one or more output devices 418 can be a display device of computer, computer monitor, TV screen, plasma display, LCD display, display on a digitizer, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 401 and non-removable storage 414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits (ASIC), single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a program module 425 may include machine-readable instructions for implementing method for product line management in accordance with the present subject matter. In one embodiment, the program module 425 may be included on a CD-ROM and loaded from the CD-ROM to a hard drive in non-volatile memory 408. The machine-readable instructions cause the computer 410 to encode according to the various embodiments of the present subject matter.

Figure 5:
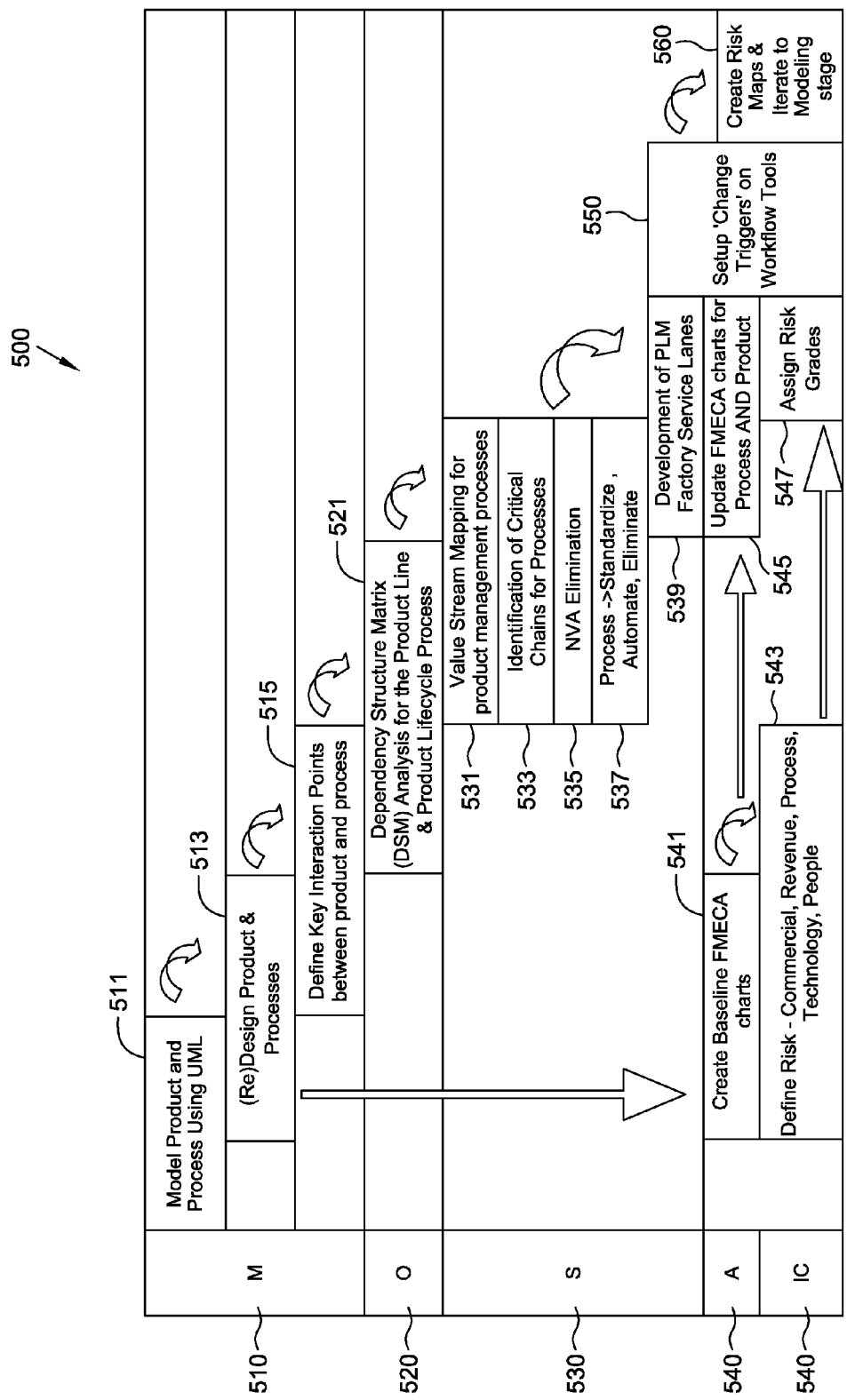
FIG. 5 shows a table view of a MOSAIC phase structure according to an embodiment of the present subject matter.

FIG. 5 is a table view of a MOSAIC phase structure 500 according to one embodiment of the present subject matter. The MOSAIC is an acronym for MOdel with business process modeling tool (such as UML), Streamline with LEAN, Assess risks, Initialize change triggers and Create the risk map. At a block 510 (M) product and/or process are modeled using business process modeling tools such as UML tools. The block includes block 511, 513 and 515 at which the produce and process are modeled, product and/or process may be redesigned or designed and key interaction points between produce and processes may be defined. At a block 520 (O) an analysis 521 for the product line and product lifecycle process may done according to a Dependency Structure Matrix (DSM). At a block 530 (S) a number of operations may be carried out. For example at a block 531 VSM for product management processes may be obtained. At a block 533 critical chains for processes may be identified. At a block

535 Non-Value Added (NVA) products/processes may be eliminated. At a block 537 the processes may be standardize, automated, or eliminated. Once operations 531, 533, 535 and 537 have been performed a PLM AL. At block 540 (A, IC), FMECA (Failure Modes Effects and Criticality Analysis) charts for process and product may be created 541. According to these charts different risk level with respect to commercial, revenue, process, technology and people etc may be defined. According to the risk levels FMECA charts may be updated and risk grades may be assigned against each risk factor at blocks 545 and 547. Risks may fall under any of the categories, for example, commercial, revenue, process, technology and/or people. Change triggers are set up on workflow tools. Also, the risk maps may be created during the designing of the product and/or the process Baseline FMEA charts may be created that may be updated at a later stage. It may be noted that the stages overlaps with one another sequentially and they do not wait for the previous task to get accomplished.

FIG. 6 to FIG. 12 show step by step implementation of a PLM system according to the present subject matter.

Figure 6:
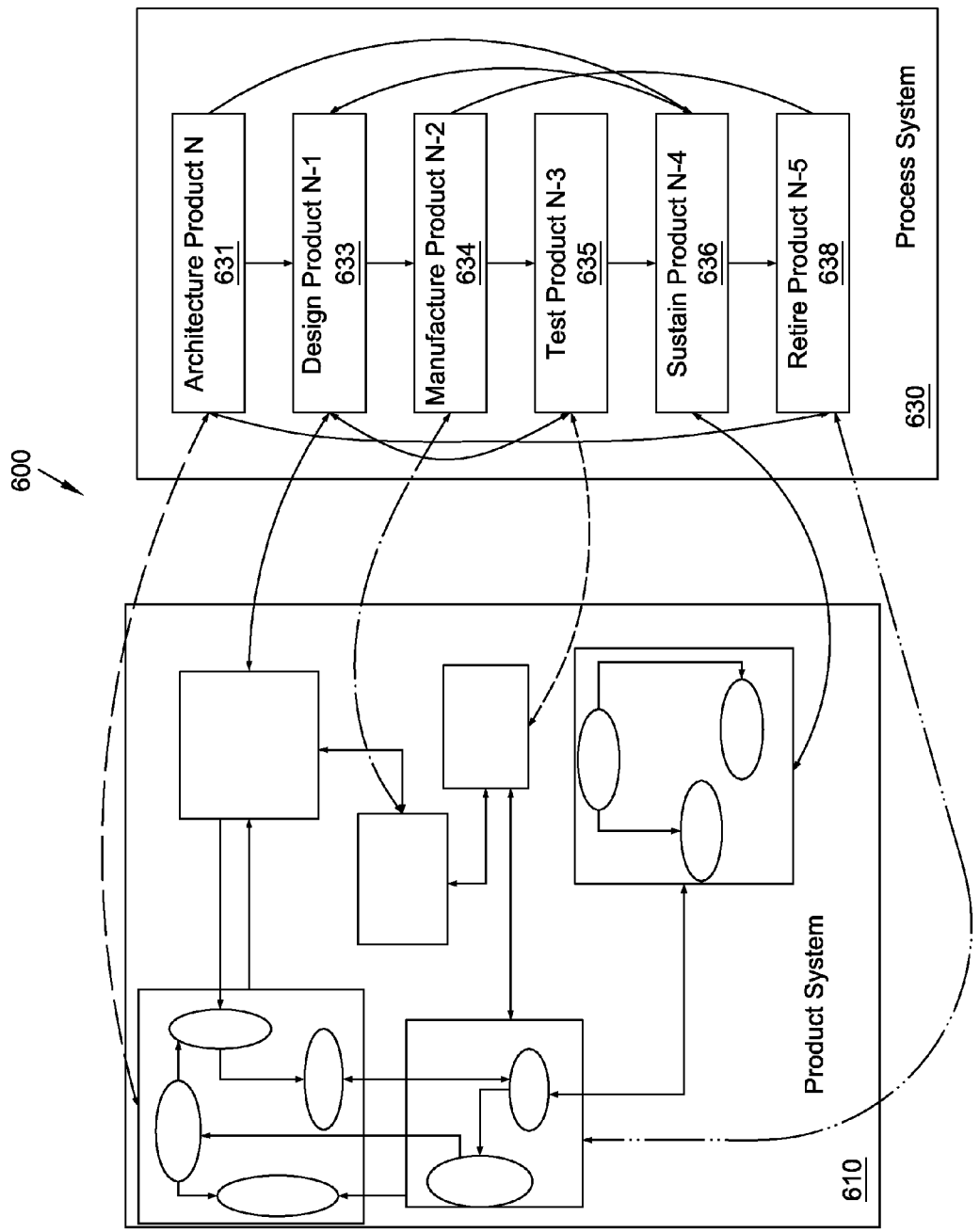

FIG. 6 shows a PLM system 600. The PLM system 600 includes a process system 630 and a product system 610. The product system 610 includes a number of products depicted by rectangular blocks and each product may include a number of components depicted by oval blocks. The products or the components of the product system 610 may interact with one another in any manner. The process system 630 depicts processes that might be running in the PLM system 600. The process system 630 shows that different product may be in different stage of the process system 630. The process system may include an architecture product stage 631, a design product stage 633, a manufacture product stage 634, a test product stage 635, a sustain product stage 636 and a retire product stage 638. At various stages of the process system 630 may interact with the either across the stage or the product system 610. Lines depicting interaction across the stages are shown as solid lines and lines depicting interaction between a stage of the process system 630 and a product and/or a component of the product system 610 are depicted by different dashed lines.

Figure 7:
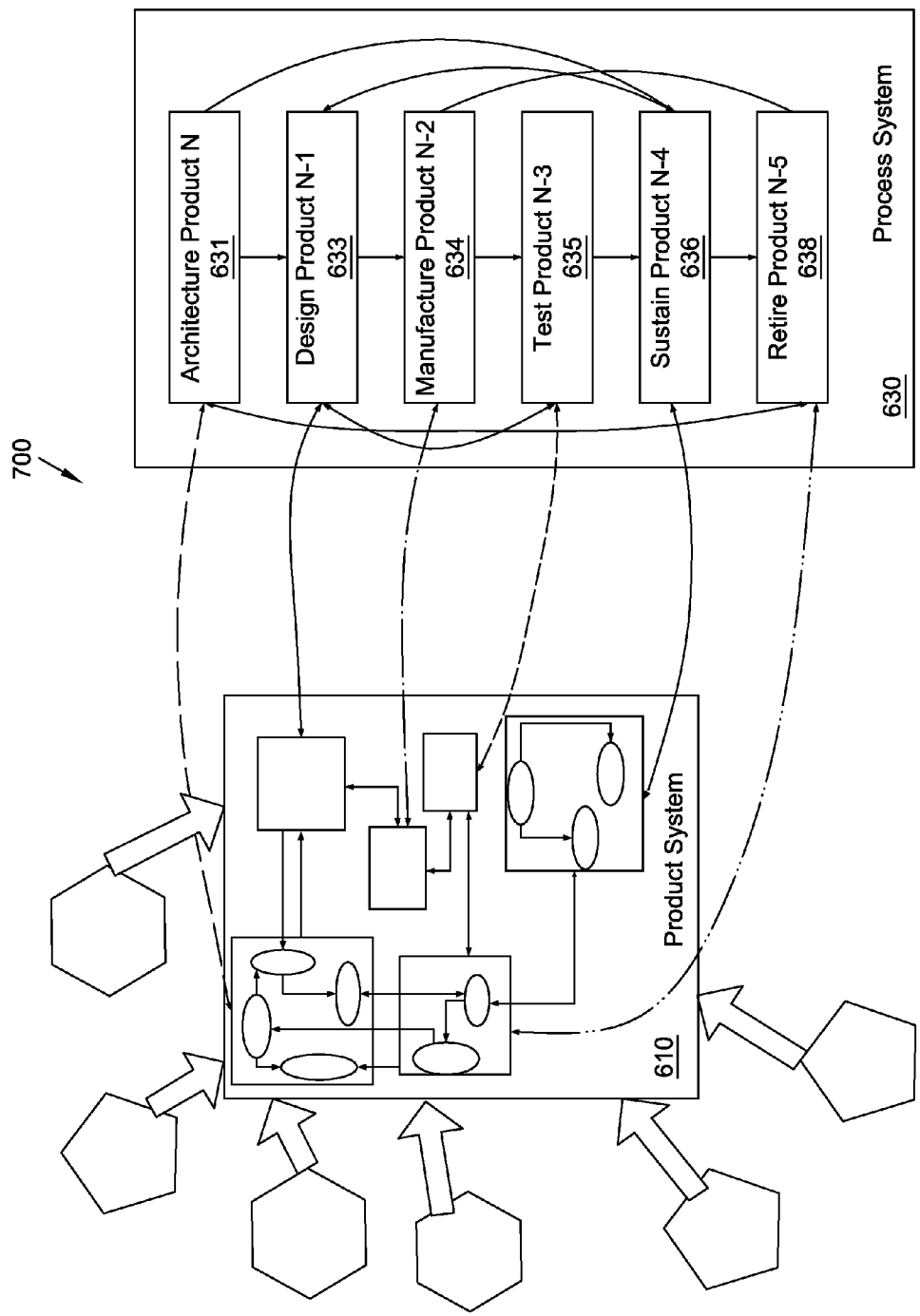
Figure 8:
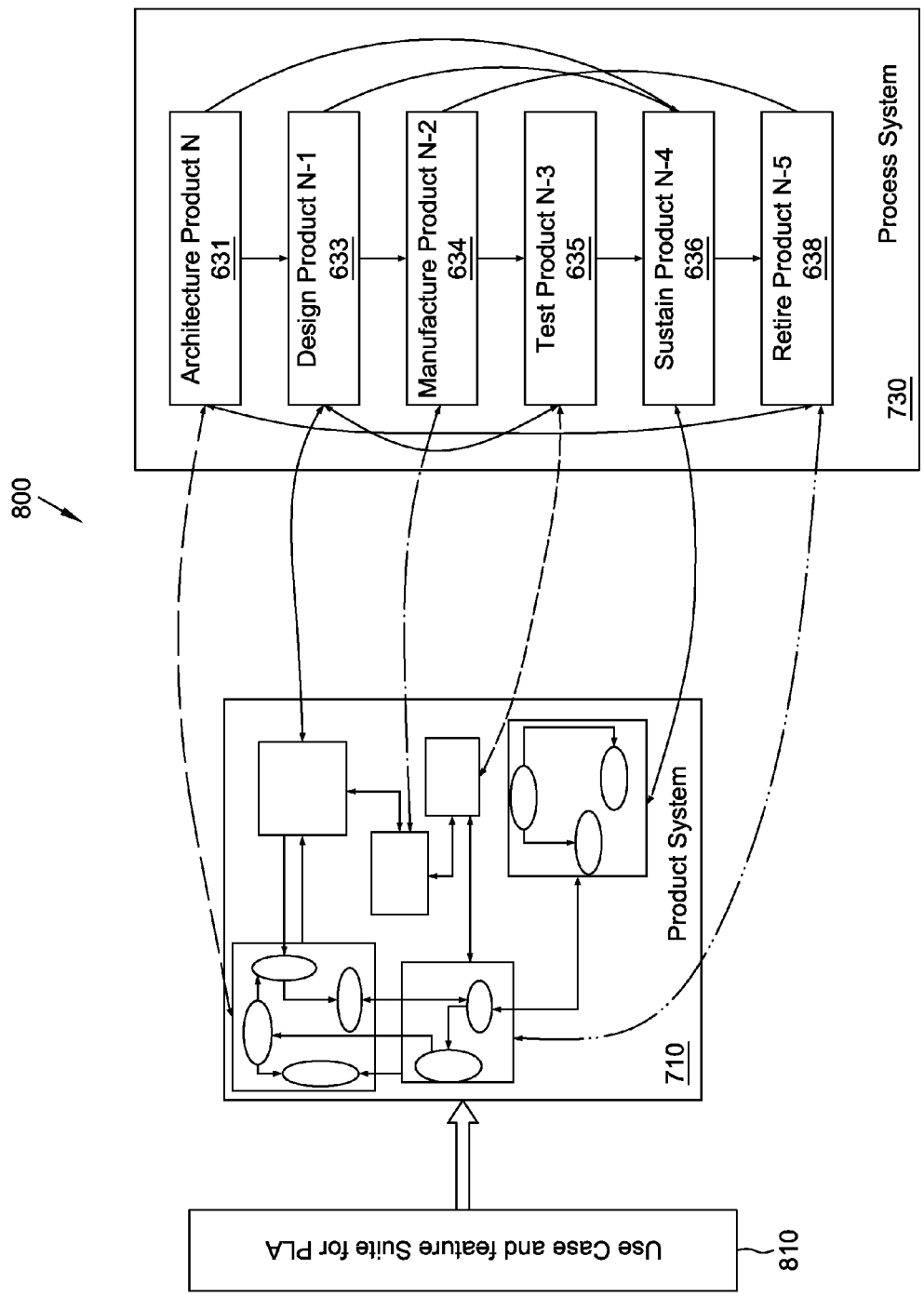
Figure 9:
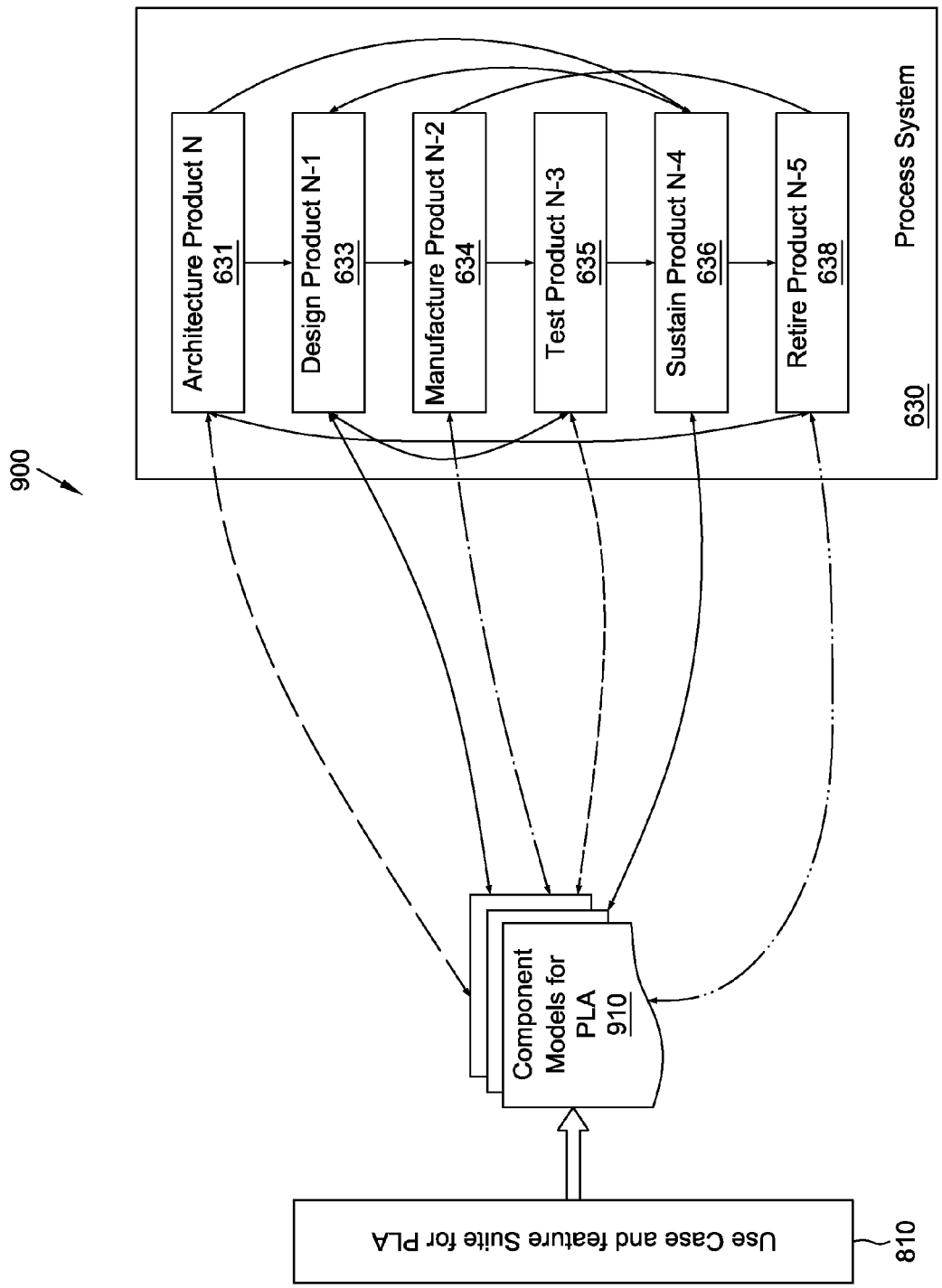

FIG. 7 shows an embodiment of a PLM system 700 according to present subject matter in more detail. The PLM system 700 includes a product system 610 and a process system 630 as described earlier. The product system 610 of the PLM system 700 is provided with use cases depicted by pentagons and components/products features depicted by hexagons. The process system still may include various stages 631, 633, 634, 635, 637 and 648 as described for FIG. 6. Consider an example of a product line that consists of music players. An organization that uses MOSAIC first defines use cases and features of its music players. Once the use cases for its music systems are defined, it may grade the use cases by the complexity and type of user and may obtain a use case suite and feature suit 810 shown in FIG. 8, 800. Obtaining use case and feature suit 810 may help the organization decide on the various types of music systems that may be marketed, e.g., a music player for those who are constantly on the move, another music player for those who are fashion conscious, another music player for those who like to be able to change various audio features etc. Subsequently for the use cases and features components are designed For example, all the music systems need to have an audio processing component. For a fashionable user there may be a touch screen controls provided in addition to the other components. On the other hand a regular user may be provided with a key based interface made from silicone/plastic etc. Such use cases and feature enables making of different component models 910 of the PLA 900 shown FIG. 9. For the product line architecture, in this case the music system, a component model library 910 is provided/created according to use case and required features. As the technical environment and the business environment changes, the use case library may keep changing and so also the component model library may get new additions, deletions or modifications to its model library. This approach also helps in identifying, analyzing and resolving similar issues on multiple products across the product line.

Figure 10:
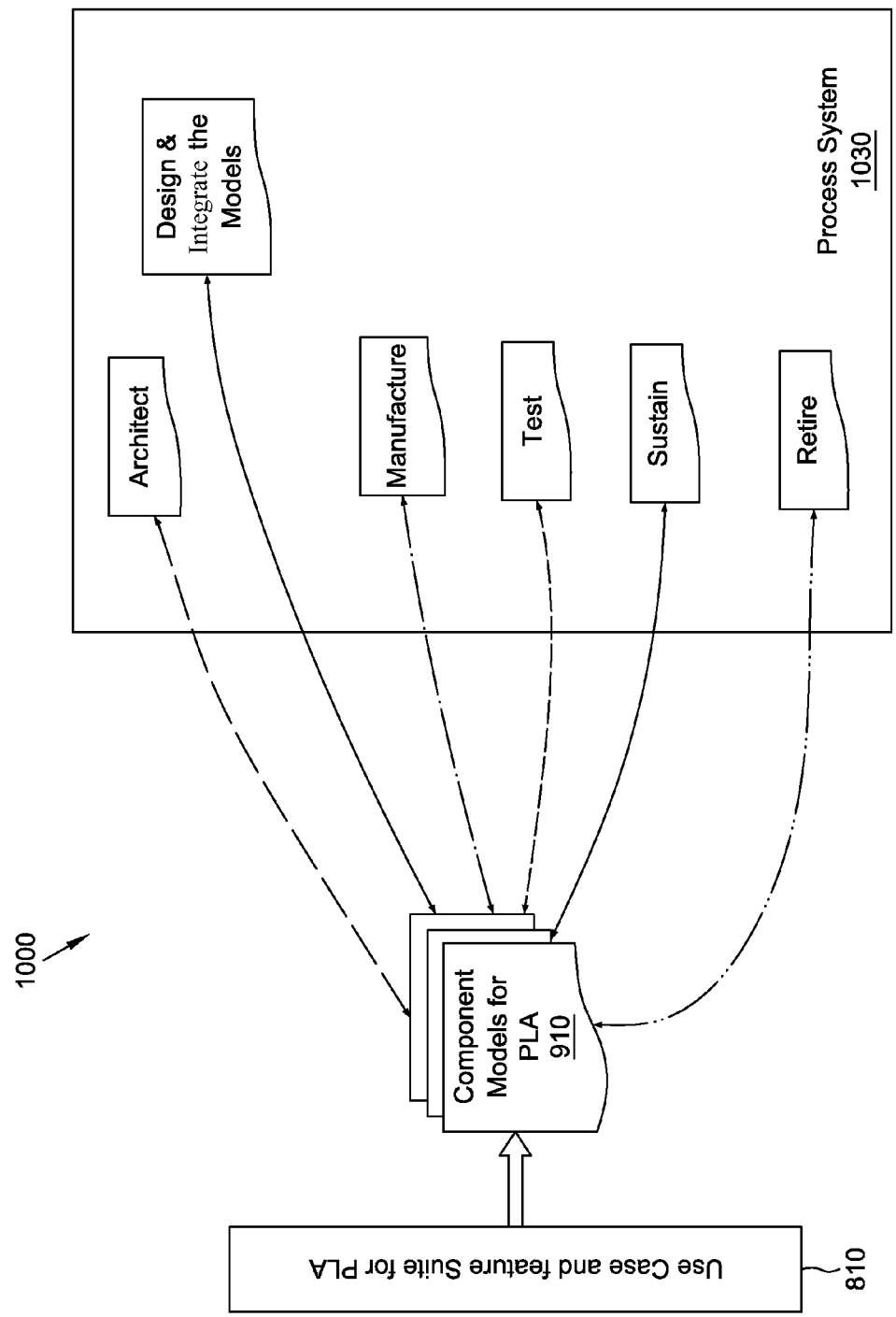

The FIG. 10 of the PLM system 1000 shows different stages of the process system 1030. Different stages of the process system 1030 may be now made independent of one another. The process system 1030 depending on commercial, financial and business strategy constraints, the architecting process, manufacturing process, testing process, sustaining process and retiring process for the various products in a product line may differ. For example, a music player company with a smaller capital base may choose to have an architecting process model that involves usage of consultants and intellectual property vendors. The creation of process model library for each of these may enable the organization to choose the appropriate process model and also identify the various interaction points and deliverables from one process model into the process stage in the next phase of a product delivery process.

Figure 11:
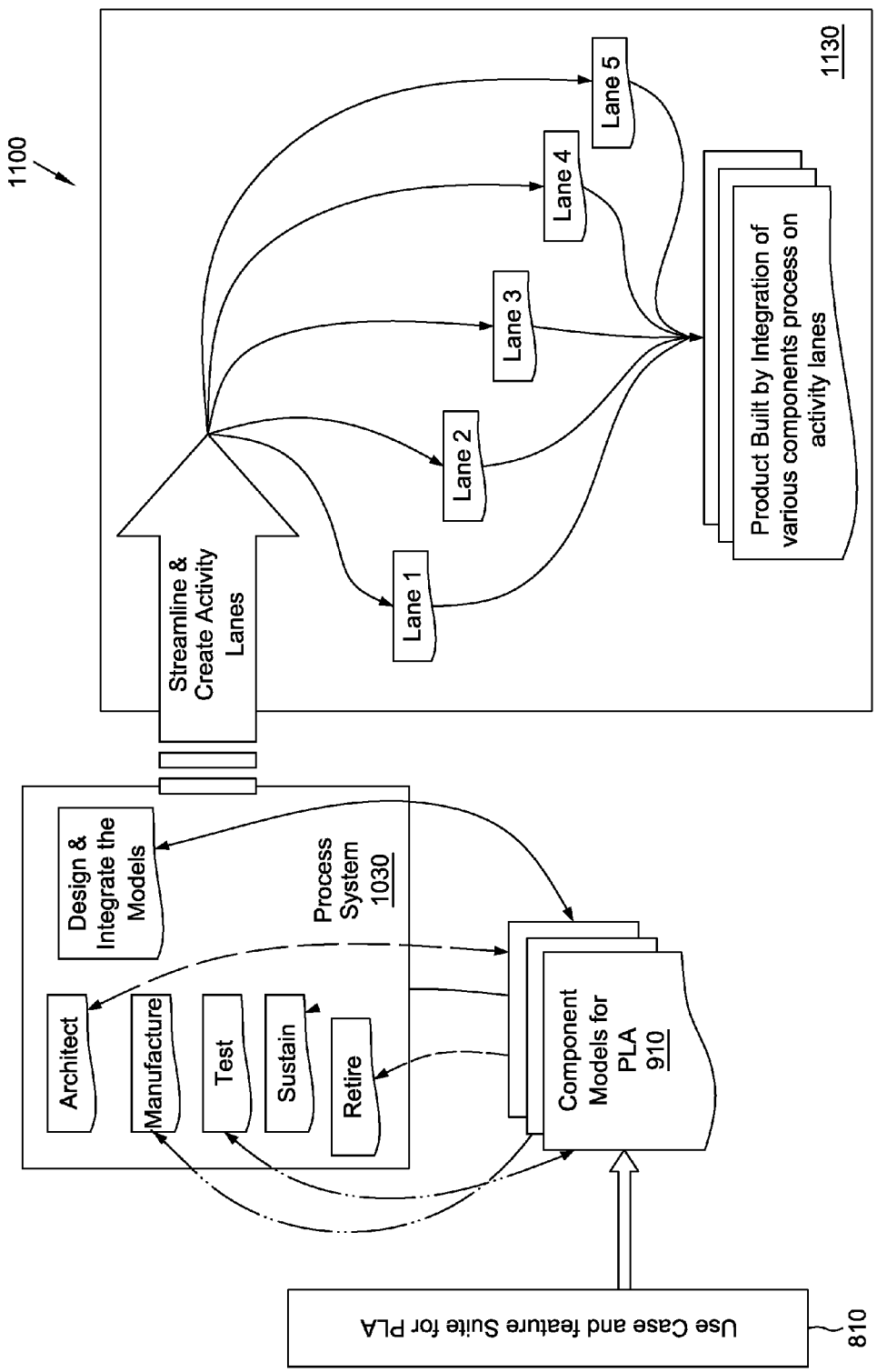

FIG. 11 shows a PLM system 1100. Once different stages of the process system 1030 are identified the processes may be streamlined and different AL may be identified (as shown in block 1130). Identification of the process models for various phases of each products lifecycle across the product line also helps in identifying the common or redundant activities. This can then be used to create the activity lanes for those activities. For example, the component engineering and procurement for the various products in the product line can be consolidated into a single activity lane for better repeatability. This approach also improves process control and measurability. This process may also be enhanced by application of LEAN techniques to streamline the activity lanes. Because of the presence of both process models as well as product models, a unified FMEA analysis can be done to identify the various failure modes for both the product and the process and we can identify the various inter-relations. For example, in the case of a touch screen music player, poor control of the touch screen integration process may end up in causing insensitive operation of the touch screen or creation of invalid messages into the processing system on the player. An integrated process and product FMEA analysis based on the process as well as component models may help in reducing the investigative time and effort in resolution of such issues.

Figure 12:
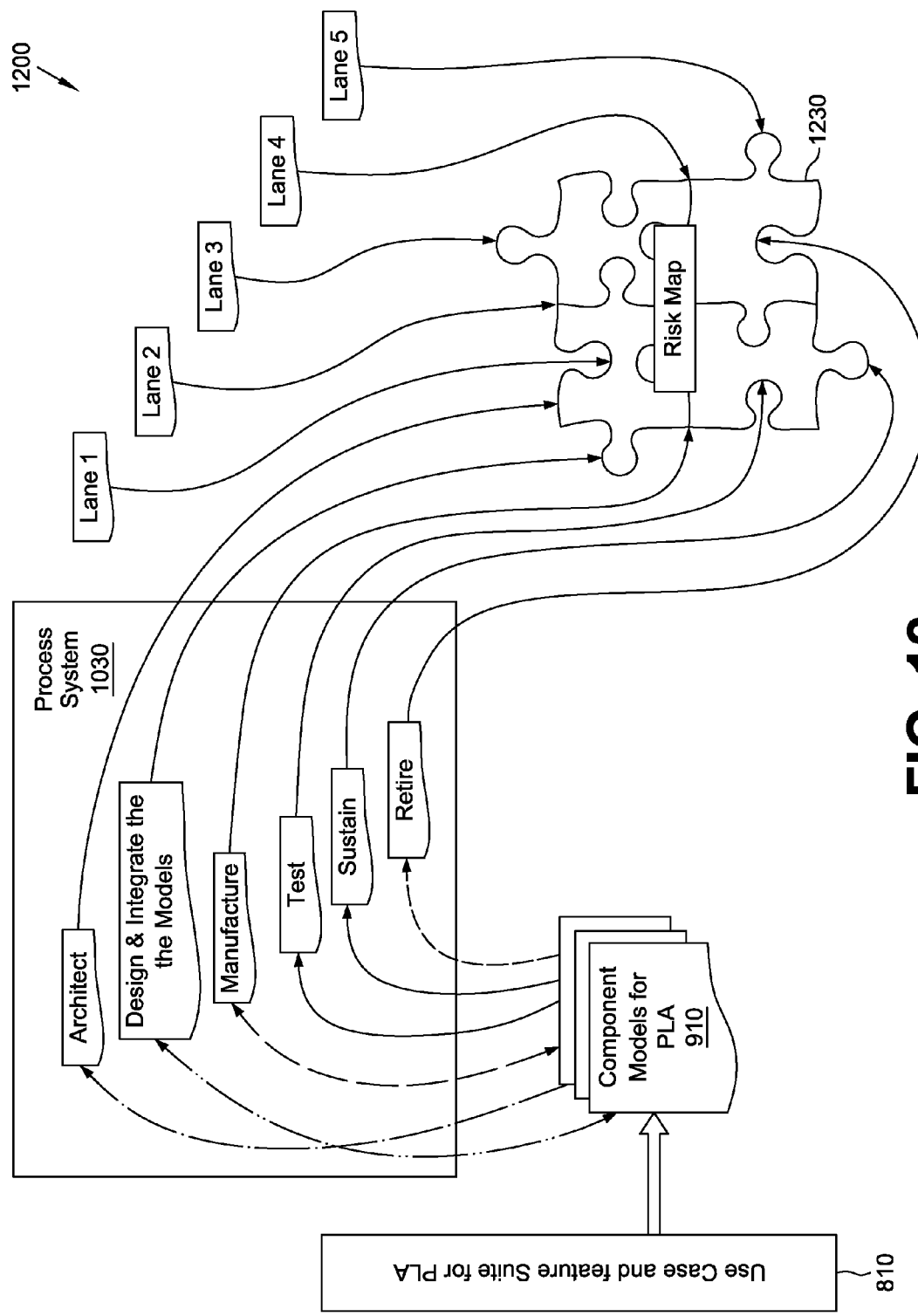

FIG. 12 shows a PLM system 1200 depicting risk map 1230. The splitting up of the PLM activities in activity lanes and the identification of the process models and the product models provides the product management team with details of the various interaction points. This can be used to create a risk map. The key interaction points between the product management process and the changes in the product (value addition stages) are also the key risk areas. Process compliance/variance at these points and measurement of those deviations help identify the risks at an early stage. For example, if a higher than required turnaround times are being observed on the component procurement stage for the keypads of the music controller, the activity lane model as well as the process models may be flagged for investigation. Further, this enables identifying the price differential between two components with similar functionality of different product lines with differing volumes may be such that it necessitates the consolidation of those into a single component. Because that the process models and the activity lanes have already been identified, elimination of those process steps that are redundant or do not add value and activity lanes may be possible.

Figure 13:
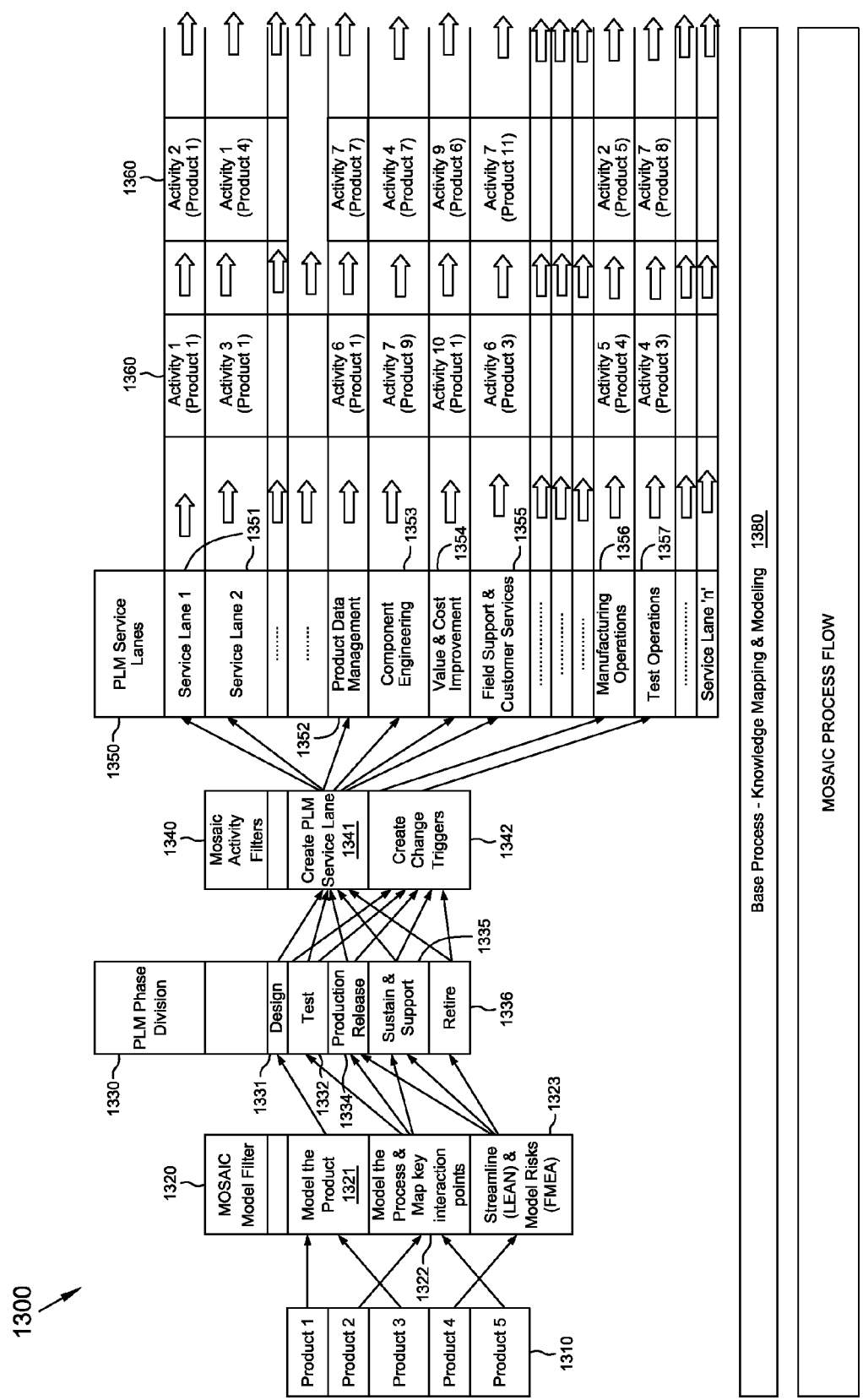
FIG. 13 shows a table view of another representation of a MOSAIC process flow according to an embodiment of the present subject matter.

FIG. 13 shows another representation 1300 of a MOSIAC process flow the present subject matter. The MOSIAC flow may include a number of stages for example MOSIAC model filter 1320, PLM phase division 1330 MOSIAC activity filter 1340, PLM service lanes 1350 and Activity lanes 1360. According to this flow a PLM system may include one or more products 1310, Product 1, Product 2, Product 3 and so on. These products may be undergoing through different sections of the MOSIAC model filter 1320. The MOSIAC model filter 1320 may include a product model section 1321, a model process and map key interaction section 1322, a streamline and model risk section 1323 and other sections. Each of these sections of the MOSIAC model filter 1320 may provide their outputs to the different sections of the stage PLM phase division 1330. The PLM phase division 1330 may include a design section 1331, a test section 1332, a production release section 1334, a sustain and support section 1335, a retire section 1336. The stage PLM phase division 1330 may invoke different sections of the MOSIAC activity filter 1340. The MOSIAC activity filter 1340 may include a create PLM service lane section 1341, and a create change trigger section 1342. The output of the MOSIAC activity filter 1340 may be provided to the PLM service lanes 1350. The PLM service lane 1350 may include a service lanes section 1351, a product data management section 1352, a component engineering section 1353, a value and cost improvement section 1354, a field support and customer service section 1355, a manufacturing operations section 1356, a test operations section 1357 and so on. The PLM service lane 1350 may create activity lines 1360 for different products. During the MOSIAC process 1300 is flowing knowledge mapping and modeling 1380 is also performed.

In brief the present subject matter provides integration of the product management practices and provides a productivity based framework. It also provides a systems approach to the management of PLM activities. Also, the present subject matter improves the usage and reuse of product as well as process models to align PLM activities to business as well as technical goals.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-13 are merely representational and are not drawn to scale. Certain proportions thereof may be exaggerated, while others may be minimized. FIGS. 1-13 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A computer-implemented method for product line management, the method comprising the steps of:
    obtaining a product line architecture (PLA) using a product line architecture module, wherein the PLA comprises architectural elements and interfaces of a product or components of a product involved in a product line and/or process;
    obtaining a change management workflow (CMW) using a change management workflow module, the CMW including a plurality of change activities and the CMW being capable of interacting with the PLA, and wherein the CMW obtains at least an interaction diagram, a swimlane diagram, a state diagram, or a traceability matrix;
    obtaining value stream maps for both the PLA and the CMW using a value stream maps module;
    creating activity lines using an activity lines module for each of the plurality of change activities according to the PLA, the CMW, the value stream maps, or any combination thereof;
    computing risk indicatives for the PLA and CMW using a risk indicatives module;
    triggering changes in the PLA and the CMW using a triggering change module according to the plurality of change activities, activity lines, risk indicatives, the value stream maps, or any combination thereof, wherein the product line architecture module, the change management workflow module, the value stream maps module, the activity lines module, the risk indicatives module and the triggering change module reside in memory of the computer; and
    repeating the steps of obtaining value stream maps onwards while managing a product line.

2. The method as claimed in claim 1, wherein the method includes a step of obtaining knowledge mapping and modeling while the steps of claim 1 are being executed.

3. The method as claimed in claim 2, wherein, the step of obtaining knowledge mapping and modeling includes a step of creating one or more data banks.

4. The method as claimed in claim 3, wherein the one or more data banks includes knowledge repositories, product model libraries, product data libraries, product change libraries, innovation scoping, value engineering maps, and product lifecycle plans for design and architecture.

5. The method as claimed in claim 1, wherein the step of obtaining a PLA is performed using hardware, firmware, software or modeling tools for business processes.

6. The method as claimed in claim 1, wherein the step of obtaining the CMW includes the steps of mapping cross functional interactions of one or more components of the product line and obtaining the traceability matrix according to the PLA.

7. The method as claimed in claim 6, wherein the step of mapping includes employing hardware, firmware, software or modeling tools for business processes.

8. The method as claimed in claim 1, wherein the step of obtaining value stream maps further comprises the steps of:
mapping of interaction points between the PLA, a product component and the product line management to identify value addition and impact areas of the CMW;
standardizing CMW;
optimizing manufacturability and testability procedures;
pruning the product line; and
obtaining value for engineering plans.

9. The method as claimed in claim 1, wherein the step of creating activity lines includes the step of eliminating and/or standardizing and/or automating the step of obtaining value stream maps.

10. The method as claimed in claim 9, further comprising the step of providing sharing activity lines for multiple components of the product line.

11. The method as claimed in claim 1, wherein the step of computing includes the step of obtaining risk indicatives from risk maps and risk strategies for a product.

12. The method as claimed in claim 11, wherein the step of obtaining includes generating risk maps and risk strategies for the product.

13. The method as claimed in claim 1, wherein triggering includes the step of actuating one or more indicators, the indicators being indicative of one or more required changes.

14. The method as claimed in claim 1, wherein the step of triggering includes the step of obtaining data from one or more data banks and assessing required changes according to obtained data, the change activities, activity lines, risk indicatives, the value stream maps, or any combination thereof, in the PLA and/or CMW.

15. The method as claimed in claim 1, wherein the step of computing risk indicatives employs Failure Mode and Effect Analysis (FMEA) for computing risk indicatives.

16. A system for product line management executing on a computer device, comprising:
a product line architecture (PLA) module, wherein the PLA module obtains architectural elements and interfaces of a product or components of a product involved in a product line and/or process;
a change management workflow (CMW) module, the CMW module including a plurality of change activities and the CMW being capable of interacting with the PLA, and wherein the CMW obtains at least an interaction diagram, a swimlane diagram, a state diagram, or a traceability matrix;
a value stream maps module obtaining value stream maps for both the PLA and the CMW;
an activity lines module for creating activity lines for each of the plurality of change activities according to the PLA, the CMW, the value stream maps, or any combination thereof;
a risk indicatives module for computing risk indicatives for the PLA and the CMW; and
a triggering change module for triggering changes in the PLA and the CMW according to the plurality of change activities, activity lines, risk indicatives, the value stream maps, or any combination thereof for managing a product line.

17. The system as claimed in claim 16, wherein the system includes a knowledge map and library module, the knowledge map and library module being configured for obtaining knowledge maps and libraries.

18. The method as claimed in claim 17, wherein the knowledge map and library module includes one or more data banks.

19. The system as claimed in claim 18, wherein the one or more data banks includes knowledge repositories, product model libraries, product data libraries, product change libraries, innovation scoping, value engineering maps, and product lifecycle plans for design and architecture.

20. The system as claimed in claim 16, wherein the PLA module includes hardware, firmware, software, or modeling tools for business processes.

21. The system as claimed in claim 16, wherein the CMW module is configured for mapping cross functional interactions of one or more components of the product line and obtaining the traceability matrix according to the PLA.

22. The system as claimed in claim 21, wherein the CMW module is configured for employing hardware, firmware, software or modeling tools for business processes.

23. The system as claimed in claim 16, wherein the value stream maps module further comprises:
a module for mapping of interaction points between the PLA, a product component and the product line management to identify value addition and impact areas of the CMW; and
a module for standardizing CMW, optimizing manufacturability and testability procedure, pruning the product line, and obtaining value for engineering plans.

24. The system as claimed in claim 16, wherein the activity lines module includes a module for eliminating and/or standardizing and/or automating the steps for obtaining value stream maps.

25. The system as claimed in claim 24, wherein the activity lines module is shared with multiple components of the product line.

26. The system as claimed in claim 16, wherein the risk indicatives module includes a module for obtaining risk indicatives from risk maps and risk strategies for a product.

27. The system as claimed in claim 16, wherein the triggering change module includes a module for actuating one or more indicators, the indicators being indicative of one or more required changes.

28. The system as claimed in claim 16, wherein the triggering change module includes a module for obtaining data from one or more data banks and assessing required changes according to the obtained data, the change activities, activity lines, risk indicatives, the value stream maps, or any combination thereof, in the PLA and/or CMW.

29. The system as claimed in claim 16, wherein the risk indicatives module is configured for employing Failure Mode and Effect Analysis (FMEA) for computing risk indicatives.

30. A computer system comprising:
a processing unit; and
a memory coupled to the processing unit, the memory having stored therein a code for performing a method for a product line management, the method comprising the steps of:
obtaining a product line architecture (PLA), wherein the PLA comprises architectural elements and interfaces of a product or components of a product involved in a product line and/or process;
obtaining a change management workflow (CMW), the CMW including a plurality of change activities and the CMW being capable of interacting with the PLA, and wherein the CMW obtains at least an interaction diagram, a swimlane diagram, a state diagram, or a traceability matrix;

obtaining value stream maps for both the PLA and the CMW;

creating activity lines for each of the plurality of change activities according to the PLA, the CMW, the value stream maps, or any combination thereof;

computing risk indicatives for the PLA and the CMW;

triggering change in the PLA and the CMW according to the plurality of change activities, activity lines, risk indicatives, the value stream maps, or any combination thereof; and repeating the steps of obtaining value stream maps onwards while managing a product line.

* * * * *